(12) United States Patent
Zhang

(10) Patent No.: US 11,853,543 B2
(45) Date of Patent: Dec. 26, 2023

(54) METHOD AND APPARATUS FOR CONTROLLING DISPLAY OF VIDEO CALL INTERFACE, STORAGE MEDIUM AND DEVICE

(71) Applicant: Beijing Bytedance Network Technology Co., Ltd., Beijing (CN)

(72) Inventor: Zhanchen Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/818,629

(22) Filed: Aug. 9, 2022

(65) Prior Publication Data
US 2022/0382427 A1 Dec. 1, 2022

Related U.S. Application Data

(63) Continuation of application No. PCT/CN2021/093812, filed on May 14, 2021.

(30) Foreign Application Priority Data

May 25, 2020 (CN) .......................... 202010458529.3

(51) Int. Cl.
*G06F 3/048* (2013.01)
*G06F 3/0488* (2022.01)
(Continued)

(52) U.S. Cl.
CPC .......... *G06F 3/0488* (2013.01); *G06F 3/0481* (2013.01); *G06F 3/0484* (2013.01);
(Continued)

(58) Field of Classification Search
CPC .... G06F 3/0488; G06F 3/0481; G06F 3/0484; G06F 2203/04803; G06F 2203/04806;
(Continued)

(56) References Cited

U.S. PATENT DOCUMENTS

| | | | | |
|---|---|---|---|---|
| 5,689,665 A | * | 11/1997 | Mitsui | G06F 3/0481 |
| | | | | 715/803 |
| 7,559,031 B2 | * | 7/2009 | Kawamura | H04N 7/152 |
| | | | | 709/204 |

(Continued)

FOREIGN PATENT DOCUMENTS

| | | |
|---|---|---|
| CN | 104010158 A | 8/2014 |
| CN | 104281409 A | 1/2015 |

(Continued)

OTHER PUBLICATIONS

International Search Report for International Patent Application No. PCT/CN2021/093812, dated Aug. 9, 2021 (18 pages).

(Continued)

*Primary Examiner* — Steven B Theriault
(74) *Attorney, Agent, or Firm* — ARENTFOX SCHIFF LLP

(57) ABSTRACT

Embodiments of the present disclosure disclose a method and apparatus for controlling display of a video call interface, a storage medium and a device. The method includes: determining a current layout mode of the video call interface, detecting a gesture operation acting on the video call interface, and when it is determined that the gesture operation satisfies a preset switch condition corresponding to the current layout mode, controlling the video call interface to switch to another corresponding layout mode.

14 Claims, 6 Drawing Sheets

(51) Int. Cl.
  *G06F 3/0481* (2022.01)
  *G06F 3/0484* (2022.01)
(52) U.S. Cl.
  CPC .............. *G06F 2203/04803* (2013.01); *G06F 2203/04806* (2013.01)
(58) Field of Classification Search
  CPC .............. H04N 7/141; H04N 21/4312; H04N 21/4438; H04N 21/472; H04N 21/4788
  See application file for complete search history.

(56) References Cited

U.S. PATENT DOCUMENTS

| | | | | |
|---|---|---|---|---|
| 8,350,891 | B2* | 1/2013 | Khot | H04N 7/15 348/14.08 |
| 9,819,877 | B1* | 11/2017 | Faulkner | H04N 7/147 |
| 10,284,812 | B1* | 5/2019 | Van Os | H04N 21/47 |
| 10,509,964 | B2* | 12/2019 | Astavans | H04N 7/152 |
| 10,674,187 | B2* | 6/2020 | Cornell | H04N 21/437 |
| 10,739,987 | B2* | 8/2020 | Hwang | G06F 3/04817 |
| 10,936,790 | B2* | 3/2021 | O'Donovan | G06F 40/103 |
| 2005/0099492 | A1* | 5/2005 | Orr | H04N 7/147 348/E7.083 |
| 2006/0244819 | A1* | 11/2006 | Pun | H04N 7/15 348/E7.083 |
| 2009/0064035 | A1* | 3/2009 | Shibata | G06F 3/0481 715/803 |
| 2009/0172556 | A1* | 7/2009 | Malmstrom | G06F 9/451 715/736 |
| 2010/0259562 | A1* | 10/2010 | Miyazawa | G06F 3/04883 345/173 |
| 2010/0333004 | A1 | 12/2010 | Kristiansen et al. | |
| 2011/0249074 | A1* | 10/2011 | Cranfill | G06F 3/04842 348/E7.083 |
| 2012/0084717 | A1 | 4/2012 | Yao et al. | |
| 2013/0002799 | A1* | 1/2013 | Mock | H04N 7/142 348/E7.083 |
| 2013/0125050 | A1* | 5/2013 | Goshey | G06F 3/0481 715/800 |
| 2013/0222308 | A1 | 8/2013 | Ma et al. | |
| 2013/0305184 | A1* | 11/2013 | Kim | G06F 9/451 715/810 |
| 2014/0002330 | A1* | 1/2014 | Teramae | G06F 3/1446 345/30 |
| 2014/0089832 | A1* | 3/2014 | Kim | G06F 3/04883 715/788 |
| 2014/0089833 | A1* | 3/2014 | Hwang | G06F 3/04817 715/780 |
| 2014/0164991 | A1* | 6/2014 | Kim | G06F 3/0481 715/788 |
| 2014/0173498 | A1* | 6/2014 | Chae | G06F 3/0481 715/778 |
| 2014/0245234 | A1* | 8/2014 | Lee | G06F 3/0481 715/863 |
| 2014/0351748 | A1* | 11/2014 | Xia | G06F 3/04886 715/798 |
| 2015/0067579 | A1* | 3/2015 | Jeong | G06F 3/0481 715/781 |
| 2015/0067588 | A1* | 3/2015 | Shim | G06F 3/04886 715/781 |
| 2015/0177979 | A1* | 6/2015 | Johansson | G06F 3/04845 715/763 |
| 2015/0253937 | A1* | 9/2015 | Kim | H04N 5/2624 715/765 |
| 2015/0271444 | A1* | 9/2015 | Defazio | H04N 5/45 348/14.07 |
| 2015/0309668 | A1* | 10/2015 | Sun | G06F 3/04845 715/783 |
| 2015/0370448 | A1* | 12/2015 | Hisano | G06F 3/0412 715/815 |
| 2016/0048320 | A1 | 2/2016 | Han et al. | |
| 2016/0062552 | A1* | 3/2016 | Jeong | G06F 3/0481 715/788 |
| 2016/0132188 | A1* | 5/2016 | Li | G06F 3/0481 715/769 |
| 2016/0210041 | A1* | 7/2016 | Yang | G06F 3/04842 |
| 2016/0224213 | A1* | 8/2016 | Chen | G06F 3/04883 |
| 2016/0239200 | A1* | 8/2016 | Fang | G06F 3/017 |
| 2016/0370864 | A1 | 12/2016 | Choi et al. | |
| 2017/0017451 | A1* | 1/2017 | Sathyanarayana Raghu | G06F 3/1454 |
| 2017/0068380 | A1* | 3/2017 | Hong | G11B 27/036 |
| 2017/0102857 | A1* | 4/2017 | Badiger | G06F 3/04847 |
| 2017/0118507 | A1* | 4/2017 | Latacz | G11B 27/02 |
| 2017/0187868 | A1* | 6/2017 | Katai | G06F 3/04817 |
| 2018/0173323 | A1* | 6/2018 | Harvey | G06F 3/011 |
| 2018/0316866 | A1* | 11/2018 | Kwon | H04N 5/232933 |
| 2019/0034073 | A1* | 1/2019 | Shi | G06F 21/36 |
| 2019/0243532 | A1* | 8/2019 | Tokuchi | G06F 3/04845 |
| 2019/0261519 | A1* | 8/2019 | Park | H05K 1/028 |
| 2019/0324635 | A1* | 10/2019 | Fu | G06F 3/04883 |
| 2020/0257433 | A1* | 8/2020 | Zha | G06F 3/0482 |
| 2020/0371673 | A1* | 11/2020 | Faulkner | G06F 3/017 |
| 2022/0197675 | A1* | 6/2022 | Adler | G06F 3/0481 |

FOREIGN PATENT DOCUMENTS

| | | |
|---|---|---|
| CN | 105159578 A | 12/2015 |
| CN | 105578111 A | 5/2016 |
| CN | 105892845 A | 8/2016 |
| CN | 106227415 A | 12/2016 |
| CN | 106598429 A | 4/2017 |
| CN | 107528938 A | 12/2017 |
| CN | 109089070 A | 12/2018 |
| CN | 109814802 A | 5/2019 |
| CN | 110196669 A | 9/2019 |
| CN | 305624246 S | 2/2020 |
| CN | 111641797 A | 9/2020 |
| EP | 2626772 A1 | 8/2013 |
| EP | 2993568 A1 | 3/2016 |
| NO | 333282 B1 | 4/2013 |

OTHER PUBLICATIONS

First Office Action for Chinese Patent Application No. 202010458529. 3, dated Apr. 28, 2021 (15 pages).

Notification to Grant Patent Right for Invention for Chinese Patent Application No. 202010458529.3, dated Jan. 6, 2022 (7 pages).

Products in the Omnimedia Era Distributed Video Systems, Southeast Communication, DOI:1013556/j.cnki.dncb.cn35-1274/j.2016. 11.019, 3 pages (2016).

Office Action in IN202227069186, dated Feb. 6, 2023, 5 pages.

Extended European Search Report in EP21813626.5, dated Oct. 18, 2023, 12 pages.

* cited by examiner

METHOD AND APPARATUS FOR CONTROLLING DISPLAY OF VIDEO CALL INTERFACE, STORAGE MEDIUM AND DEVICE

CROSS-REFERENCE TO RELATED APPLICATIONS

The present application is a continuation of International Application No. PCT/CN2021/093812, filed on May 14, 2021, which claims priority to Chinese patent application No. 202010458529.3, filed on May 25, 2020. The disclosures of the aforementioned applications are hereby incorporated by reference in their entireties.

TECHNICAL FIELD

Embodiments of the present disclosure relate to the technical field of computer, and in particular, to a method and apparatus for controlling display of a video call interface, a storage medium and a device.

BACKGROUND

With the rapid development of the Internet and intelligent terminals, the video call function is becoming more and more popular. In a video call interface, multiple video windows are usually used to simultaneously display video images of two or more parties, and a display mode of each window may affect the final display effect. Therefore, it is necessary to reasonably control the display of the video call interface.

For example, different layout modes can be set for multiple windows, and be switched according to actual situations. At present, the solutions to switch the layout of the video call interface depend on buttons and other controls fixed on the video call interface. The buttons not only occupy space of the video call interface, but also affect the appearance of the video call interface. Therefore, the existing solutions for controlling display of the video call interface are not perfect and needs to be improved.

SUMMARY

Embodiments of the present disclosure provide a method and apparatus for controlling display of a video call interface, a storage medium and a device.

In a first aspect, an embodiment of the present disclosure provides a method for controlling display of a video call interface, including:

determining a current layout mode of the video call interface;

detecting a gesture operation acting on the video call interface; and when it is determined that the gesture operation satisfies a preset switch condition corresponding to the current layout mode, controlling the video call interface to switch to another corresponding layout mode.

In a second aspect, an embodiment of the present disclosure provides an apparatus for controlling display of a video call interface, including:

the video call interface includes at least two windows for displaying video pictures, and the apparatus includes:

a layout mode determining module, configured to determine a current layout mode of the video call interface;

a gesture operation detecting module, configured to detect a gesture operation acting on the video call interface; and a display controlling module, configured to: when it is determined that the gesture operation satisfies a preset switch condition corresponding to the current layout mode, control the video call interface to switch to another corresponding layout mode.

In a third aspect, an embodiment of the present disclosure provides a computer-readable storage medium storing a computer program, where when the program is executed by a processor, the method for controlling display of the video call interface provided by the embodiments of the present disclosure is implemented.

In a fourth aspect, an embodiment of the present disclosure provides an electronic device, including a memory, a processor, and a computer program stored in the memory and executable on the processor, where when the processor executes the computer program, the method for controlling display of the video call interface provided by the embodiments of the present disclosure is implemented.

In a fifth aspect, an embodiment of the present disclosure provides a computer program product, including: a computer program stored in a readable storage medium, where at least one processor of an electronic device can read the computer program from the readable storage medium, and the at least one processor executes the computer program to cause the electronic device to perform the method according to the above first aspect.

In a sixth aspect, an embodiment of the present disclosure provides a computer program stored in a readable storage medium, where at least one processor of an electronic device can read the computer program from the readable storage medium, and the at least one processor executes the computer program to cause the electronic device to perform the method according to the above first aspect.

According to the solution for controlling display of the video call interface provided by embodiments of the present disclosure, a current layout mode of the video call interface is determined, a gesture operation acting on the video call interface is detected, and when it is determined that the gesture operation satisfies a preset switch condition corresponding to the current layout mode, the video call interface is controlled to switch to another corresponding layout mode.

DESCRIPTION OF EMBODIMENTS

Figure 1:
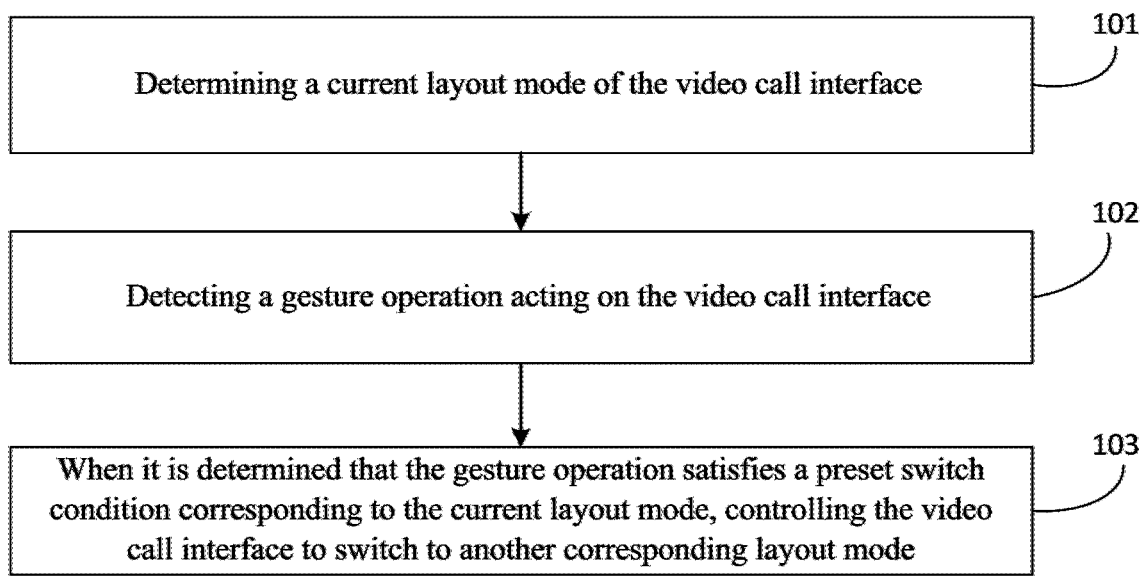
FIG. 1 is a schematic flowchart of a method for controlling display of a video call interface provided by an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as limited to the embodiments set forth here. On the contrary, these embodiments are provided for a more thorough and complete understanding of the present disclosure. It should be understood that the drawings and embodiments of the present disclosure are only for illustrative purposes, and are not intended to limit the scope of protection of the present disclosure.

It should be understood that the steps described in the method embodiments of the present disclosure can be performed in different orders and/or in parallel. In addition, the method embodiments may include additional steps and/or omit the steps shown. The scope of the present disclosure is not limited in this respect.

As used herein, the term "include" and its variations are open inclusions, that is, "include but not limited to". The term "based on" refers to "based at least in part". The term "one embodiment" represents "at least one embodiment"; the term "another embodiment" represents "at least one other embodiment"; and the term "some embodiments" represents "at least some embodiments". Relevant definitions of other terms will be given in the following description.

It should be noted that the concepts of "first" and "second" mentioned in the present disclosure are only used to distinguish different apparatuses, modules or units, and are not used to limit the order or interdependence of the functions performed by these apparatuses, modules or units.

It should be noted that the modifications of "one" and "multiple" mentioned in the present disclosure are illustrative rather than restrictive, and those skilled in the art should understand that unless the context clearly indicates otherwise, they should be understood as "one or more".

The names of messages or information exchanged between multiple apparatuses in the present embodiment are only for illustrative purposes, and are not intended to limit the scope of these messages or information.

In the following embodiments, optional features and examples are provided in each embodiment at the same time. The features described in the embodiments can be combined to form a plurality of optional solutions, and each numbered embodiment should not be regarded as only one technical solution.

FIG. 1 is a schematic flowchart of a method for controlling display of a video call interface provided by an embodiment of the present disclosure, and the method can be performed by an apparatus for controlling display of the video call interface, where the apparatus can be implemented by software and/or hardware, and generally can be integrated in an electronic device. The electronic device may be a device with video call functions, such as a mobile phone, a tablet computer, a laptop computer and a personal digital assistant, etc.

As shown in FIG. 1, the method includes:

Step 101, determining a current layout mode of the video call interface.

Illustratively, a video call function usually supports a one-to-one two-person call mode and a multi-person call mode. Generally, the video call interface may include at least two windows for displaying video pictures. For example, in the two-person call mode, there may be two video windows (hereinafter referred to as window) used to display video pictures of both calling parties respectively; and in the multi-person call mode, there may be two or more windows used to display video pictures of at least two parties in the multiple calling parties respectively. Certainly, according to actual requirements, there can also be only one window displayed, for example, a window of one calling party in the opposite end. The video picture is generally a real time call picture, for example, images collected in real time by an image acquiring apparatus (such as a camera, etc.) in an electronic device adopted by the calling party.

For example, in order to make the video call interface more diversified and better meet different requirements of users, two or more layout modes can usually be configured for the video call interface. In different layout modes, layout rules for the windows are different. The layout rules may include at least one or a combination of a plurality of the following aspects: a nesting relationship between windows, an adjacency relationship between windows, a plane arrangement order of windows, a superposition order of window layers, display positions of windows, display sizes of windows and shapes of windows, etc.

Step 102, detecting a gesture operation acting on the video call interface.

Illustratively, a screen of the electronic device may be a touch screen, and the gesture operation may be a touch gesture operation acting on the video call interface displayed on the screen; the screen of the electronic device can also be other types of screens, and at this time, the gesture operation can also be an air gesture operation (a gesture operation from a distance) corresponding to the video call interface displayed on the screen. Certainly, if it is a touch screen, the gesture operation may also be an air gesture operation. Different types of gesture operations may correspond to different detection manners, which can be set according to actual situations. For example, the touch gesture operation can be detected by the touch screen; the air gesture operation can be detected by components such as ultrasonic sensors on electronic devices.

Step 103, when it is determined that the gesture operation satisfies a preset switch condition corresponding to the current layout mode, controlling the video call interface to switch to another corresponding layout mode.

Illustratively, switch conditions for switching between different layout modes can be set in advance, and the switch condition may include specific gesture operation information. The gesture operation information may include a types of gesture (such as single-click, double-click, long press, drag, and multi-point touch gesture such as double-finger and multi-finger sliding, etc.), and may also include a sliding track, a gesture action area, and a gesture action duration, etc.

It should be noted that there may be one or more preset switch conditions corresponding to switching from one layout mode to another layout mode, and if there are more than one, the switching can be performed when any one therein is satisfied. For ease of understanding, one preset switch condition is taken as an example for description.

Assuming that there are two layout modes, such as a first layout mode and a second layout mode. Switching from the first layout mode to the second layout mode corresponds to a first preset switch condition, and switching from the second layout mode to the first layout mode corresponds to a second preset switch condition.

Assuming there is a third layout mode, such as a first layout mode, a second layout mode and a third layout mode. Switching from the first layout mode to the second layout mode corresponds to a first preset switch condition, and switching from the second layout mode to the first layout mode corresponds to a second preset switch condition; switching from the first layout mode to the third layout mode corresponds to a third preset switch condition, and switching from the third layout mode to the first layout mode corresponds to a fourth preset switch condition; switching from the second layout mode to the third layout mode corresponds to a fifth preset switch condition, and switching from the third layout mode to the second layout mode corresponds to a sixth preset switch condition.

When a current layout mode is determined, it can be determined to which layout modes the current layout mode can be switched, and further the detected gesture operation is compared with the corresponding preset switch condition, and when the corresponding preset switch condition is satisfied, the video call interface is controlled to switch to another corresponding layout mode. For example, taking the above existing three layout modes as an example, it is assumed that the current layout mode is the first layout mode, and it may be switched to the second layout mode or the third layout mode, and it can be determined the preset switch conditions that need to be compared are the first preset switch condition and the third preset switch condition.

According to the solution for controlling display of the video call interface provided by embodiments of the present disclosure, where the video call interface includes at least two windows for displaying video pictures, a current layout mode of the video call interface is determined, a gesture operation acting on the video call interface is detected, and when it is determined that the gesture operation satisfies a preset switch condition corresponding to the current layout mode, the video call interface is controlled to switch to another corresponding layout mode. By adopting the above technical solution, the gesture operation can be used to switch the layout mode of the video call interface effectively and conveniently, switching entrance such as buttons can be omitted, so as to save space of the video call interface, and the appearance of the video call interface is also made more pretty.

In an embodiment, the video call interface includes at least the first layout mode and the second layout mode. The first layout mode includes a main window and at least one sub-window, where the at least one sub-window is nested in the main window; the second layout mode includes at least two parallel windows, where each of the parallel windows displays a complete video picture of a calling party. The advantage of such setting is that the two modes can basically meet the requirements of different scenarios, reduce the amount of computation and improve the switching speed. In the first layout mode, the main window generally occupies the whole video call interface, and if each window corresponds to one layer, the main window is located at the bottom layer, and the sub-window is located at the top or middle layer. The display size of the sub-window is generally small, for example, 1/16 of the main window. Therefore, the sub-window will only cover a small part of the video picture in the main window. In the second layout mode, the arrangement of parallel windows is not limited, which can be determined according to the size of the screen or the display mode of the screen (such as horizontal display or vertical display) of the electronic device. Taking two parallel windows as an example, the two windows can be arranged as upper and lower, for example, a first parallel window occupies an upper half of the video call interface, and a second parallel window occupies a lower half of the video call interface, and the two windows can also be arranged as left and right. Taking four parallel windows as an example, the four windows can be arranged in a manner of a field shape, and display sizes of the four windows may or may not be the same.

In an embodiment, if the current layout mode is the first layout mode, where when it is determined that the gesture operation satisfies a preset switch condition corresponding to the current layout mode, controlling the video call interface to switch to another corresponding layout mode includes: when it is determined, according to the gesture operation, that a first sub-window is dragged into a first preset area range at a center of the video call interface, switching and displaying the main window as a first parallel window in the second layout mode, and simultaneously displaying the first sub-window, in an original size, in a video frame corresponding to a second parallel window; and after it is determined, according to the gesture operation, that the first sub-window is released, switching and displaying the first sub-window to fully occupy the video frame. The advantage of such setting is that the switching from the first layout mode to the second layout mode can be conveniently and accurately implemented. Further, a position of the first parallel window can be determined according to a position of the first sub-window in the first preset area range. The first preset area range can be set according to actual requirements, for example, the video call interface can be divided into three parts from left to right, and the range corresponding to the middle area is taken as the first preset area range. The dragging can be understood as pressing and sliding, and can be a single-finger or multi-finger operation. The video frame can be understood as a boundary corresponding to the second parallel window, and can be regarded as an identification of a corresponding result given by the system, which prompts the user with display effect after switching. The background of the video frame is not limited, for example, it may be black or white, etc. If satisfied with the effect after switching, the user can release the finger, so that the size of the first sub-window can become the same as that of the video frame, and the final switching is completed.

In an embodiment, if the current layout mode includes a second sub-window, while displaying the first sub-window in the video frame corresponding to the second parallel window, the method further includes: displaying the second sub-window, in an original size, in a video frame corresponding to a third parallel window, or switching and displaying the second sub-window as a third parallel window. The advantage of such setting is that it can be applied to a scenario of multi-party video call. The second sub-window can generally refer to sub-window(s) other than the first sub-window, and the specific number can be one or more; the third parallel window can generally refer to parallel window(s) other than the first parallel window and the second parallel window, and the specific number can be one or more. Generally, the number of the second sub-windows and the number of the third parallel windows can be the same.

In an embodiment, if the current layout mode is the second layout mode, where when it is determined that the gesture operation satisfies a preset switch condition corresponding to the current layout mode, controlling the video call interface to switch to another corresponding layout mode includes: when it is determined, according to the gesture operation, that a first parallel window is dragged into a second preset area range at two sides of the video call interface, switching and displaying a second parallel window as the main window in the first layout mode, and simultaneously switching and displaying the first parallel window as a first sub-window; and after it is determined, according to the gesture operation, that the first sub-window is released, fixing a display position of the first sub-window. The advantage of such setting is that the switching from the second layout mode to the first layout mode can be conveniently and accurately implemented. Further, the display position of the first sub-window after being fixed can be determined according to the position of the first sub-window before being released. The second preset area range can be set according to actual requirements, for example, after the video call interface is divided equally into three parts from left to right, the range corresponding to the left area and the right area is taken as the second preset area range.

In an embodiment, after the detecting the gesture operation acting on the video call interface, the method further includes: when it is determined that the gesture operation is a scaling operation acting on a first window, adjusting a display size of the first window according to the scaling operation. The advantage of such setting is that the display size of the window can be adjusted by using the gesture operation, which makes the display of each window more flexible, suitable for more usage scenarios, and able to meet more usage requirements of users. The scaling operation can be, for example, two-finger scaling or multi-finger scaling. For example, the enlarging operation refers to outward sliding of two or more fingers by taking the contact point as the center after touching the screen, and the narrowing operation refers to inward sliding of two or more fingers by taking the contact point as the start point after touching the screen. The first window can be a window in any layout mode. The display size of the first window can dynamically change with the scaling operation, and when the first window is released, the display size of the first window is fixed. If the first window is a window in the second layout mode, when the size of the first window changes, the sizes of other parallel windows can be adaptively adjusted.

In an embodiment, if the current layout mode is the first layout mode, where when it is determined that the gesture operation satisfies a preset switch condition corresponding to the current layout mode, controlling the video call interface to switch to another corresponding layout mode includes: when it is determined, according to the gesture operation, that a size of a first sub-window is enlarged to a first preset size threshold, switching and displaying the main window as a first parallel window in the second layout mode, and simultaneously displaying the first sub-window, in a current size, in a video frame corresponding to a second parallel window; and after it is determined, according to the gesture operation, that the first sub-window is released, switching and displaying the first sub-window to fully occupy the video frame. The advantage of such setting is that the switching from the first layout mode to the second layout mode can be conveniently and accurately implemented, and can be combined with the solution of adjusting the display size of the window by scaling. The first preset size threshold can be set according to actual requirements, and the size can be represented by length, width or area, etc., for example, the area corresponding to the first preset size threshold is one third of the video call interface. The position of the first parallel window can be determined according to the position of the first sub-window after being enlarged.

In an embodiment, if the current layout mode is the second layout mode, where when it is determined that the gesture operation satisfies a preset switch condition corresponding to the current layout mode, controlling the video call interface to switch to another corresponding layout mode includes: when it is determined, according to the gesture operation, that a size of a first parallel window is narrowed to a second preset size threshold, switching and displaying a second parallel window as the main window in the first layout mode, and simultaneously switching and displaying the first parallel window as a first sub-window; and after it is determined, according to the gesture operation, that the first sub-window is released, fixing a display position of the first sub-window. The advantage of such setting is that the switching from the second layout mode to the first layout mode can be conveniently and accurately implemented, and can be combined with the solution of adjusting the display size of the window by scaling. The second preset size threshold can be set according to actual requirements, and the size can be represented by length, width or area, etc., for example, the area corresponding to the second preset size threshold is one fourth of the video call interface. The position of the first sub-window can be determined according to the position of the first parallel window after being narrowed.

In an embodiment, if the current layout mode includes a second sub-window, while displaying the first sub-window, in an original size, in the video frame corresponding to the second parallel window, the method may further include: displaying the second sub-window, in an original size, in a video frame corresponding to a third parallel window, or switching and displaying the second sub-window as a third parallel window. The advantage of such setting is that it can be applied to the scenario of multi-party video call.

In an embodiment, the gesture operation can also be used to implement adjustment of the display position of the window. In an embodiment, if the current layout mode is the second layout mode, after the detecting the gesture operation acting on the video call interface, the method further includes: when it is determined, according to the gesture operation, that the first parallel window is moving towards the second parallel window, and an overlapped area of the first parallel window and the second parallel window reaches a first area threshold, switching display positions of the first parallel window and the second parallel window. The advantage of such setting is that the display positions of parallel windows can be conveniently adjusted, and the flexibility of this layout mode is enhanced. The first area threshold can be a fixed value or the product of the area of the first parallel window or the second parallel window and a preset coefficient, which can be set according to actual requirements.

In an embodiment, if the current layout mode is the first layout mode, after detecting the gesture operation acting on the video call interface, the method further includes: when it is detected that the first sub-window is dragged, changing a display position of the first sub-window in real time during the dragging process, and when it is detected that the first sub-window is released, fixing the first sub-window. The advantage of such setting is that the display positions of sub-windows can be conveniently adjusted, and the flexibility of this layout mode is enhanced. In addition, in order to be more compatible with the solution of layout mode switching, determinations on, for example, staying time or the number of fingers performing the dragging operation can be added. For example, when it is determined, according to the gesture operation, that the first sub-window is dragged to the first preset area range in the center of the screen and stays for a time longer than a first preset duration, switching and displaying the main window as the first parallel window in the second layout mode; for another example, when it is determined, according to the gesture operation, that the first sub-window is dragged to the first preset area range in the center of the screen by double fingers, switching and displaying the main window as the first parallel window in the second layout mode.

In an embodiment, if the current layout mode is the first layout mode, after the detecting the gesture operation acting on the video call interface, the method further includes: when it is determined, according to the gesture operation, that the first sub-window is dragged into a third preset area range in the main window, switching display positions of the first sub-window and the main window. The advantage of such setting is that the switching manner of the main window can be enriched, and the operation process is more intuitive. The center of the third preset area range can coincide with the center of the main window, and specific boundary can be set according to actual requirements.

In an embodiment, if the current layout mode is the first layout mode and there exist at least two sub-windows, after the detecting the gesture operation acting on the video call interface, the method further includes: when a first preset gesture operation acting on a first sub-window is detected, hiding other sub-windows beneath the first sub-window; when a second preset gesture operation acting on the first sub-window is detected, switching video pictures of the first sub-window and a second sub window hidden beneath the first sub-window; when a third preset gesture operation acting on the first sub-window is detected, switching all sub-windows hidden beneath the first sub-window to a top layer of the video call interface for display. The advantage of such setting is that, in the multi-person call mode, sub-windows corresponding to some call parties can be stacked, which reduces the occupation of the display area of the main window, and at the same time, the stacking manner and stacking order can be flexibly controlled by the gesture operations. The above three preset gesture operations can be freely set, for example, the first preset gesture operation can be long press, the second preset gesture operation can be click, and the third preset gesture operation can also be long press.

Figure 2:
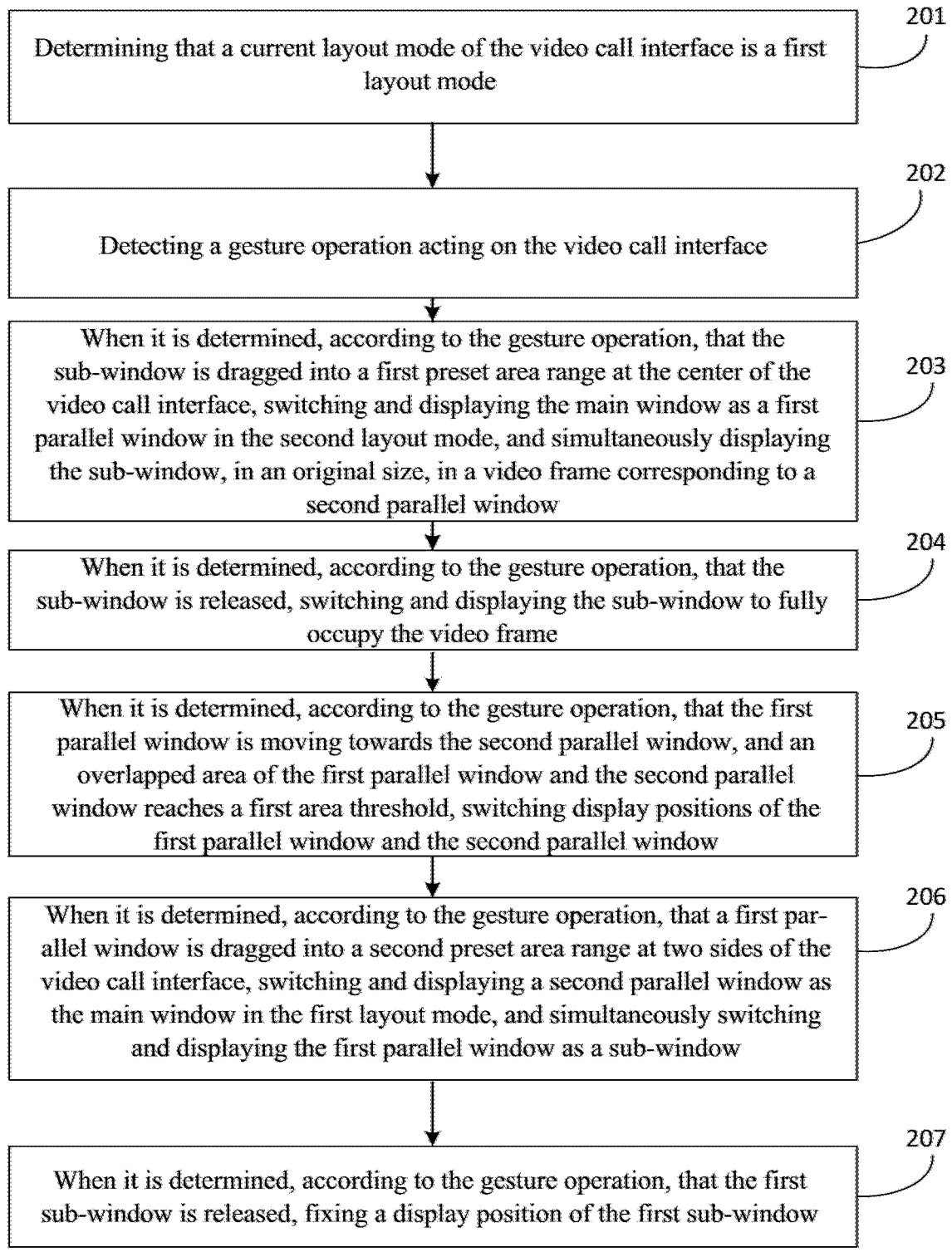
FIG. 2 is a schematic flowchart of another method for controlling display of a video call interface provided by an embodiment of the present disclosure.

FIG. 2 is a schematic flowchart of another method for controlling display of a video call interface provided by an embodiment of the present disclosure. Taking a one-to-one call mode as an example, as shown in FIG. 2, the method includes:

Step 201, determining that a current layout mode of the video call interface is a first layout mode.

Figure 3:
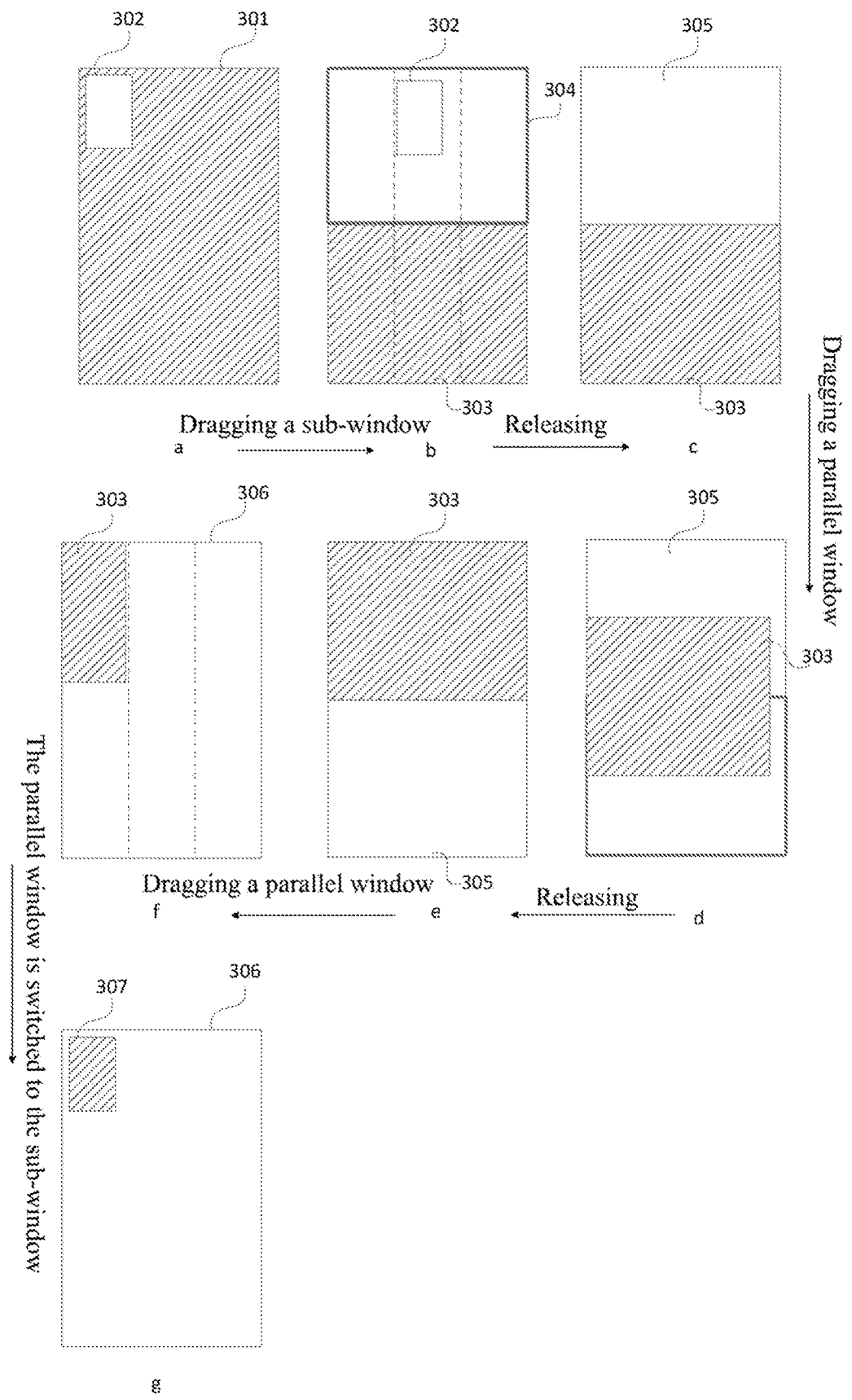
FIG. 3 is a schematic diagram of a switching procedure of layout modes provided by an embodiment of the present disclosure.

FIG. 3 is a schematic diagram of a switching procedure of layout modes provided by an embodiment of the present disclosure. The video call interface in a first layout mode (also referred to as a large-small screen mode) is shown as an interface a in FIG. 3, which includes a main window 301 (i.e., the large screen, indicated by diagonal shading) and a sub-window 302 (the small screen).

Step 202, detecting a gesture operation acting on the video call interface.

Step 203, when it is determined, according to the gesture operation, that the sub-window is dragged into a first preset area range at a center of the video call interface, switching and displaying the main window as a first parallel window in the second layout mode, and simultaneously displaying the sub-window, in an original size, in a video frame corresponding to a second parallel window.

As shown in an interface b in FIG. 3, the video call interface is divided into three areas by two dotted lines, and the middle area may correspond to the first preset area range. Illustratively, the display position of the sub-window can be changed in real time in the dragging process. When the sub-window 302 is dragged into the first preset area range, the main window is displayed as a first parallel window 303 in the second layout mode (in which there are two parallel windows distributed upper and lower, also referred to as upper-lower screen mode). Since the sub-window 302 is dragged to the upper half of the first preset area range, the main window can be displayed as the first parallel window 303 in the lower half of the whole video call interface, and a corresponding video frame 304 is displayed in the position of the second parallel window in the upper half, and the sub-window 302 is displayed in the video frame 304. In such way, the user can more intuitively see the expected effect after switching, which is more in line with the user's intuition than other switching manners such as directly clicking the button.

Step 204, when it is determined, according to the gesture operation, that the sub-window is released, switching and displaying the sub-window to fully occupy the video frame.

Illustratively, when feeling that switching expectation is satisfied, the user can release the finger, so as to complete the switching from the first layout mode to the second layout mode. The effect after switching is shown in an interface c in FIG. 3, and after fully occupying the video frame, the sub-window 302 becomes the second parallel window 305 in the second layout mode.

In the first layout mode, scaling operation can be imposed to the sub-window through double fingers, so as to dynamically adjust the display size of the sub-window. It should be noted that, in the process of switching or adjusting the display size, video pictures displayed inside can be adaptively adjusted according to change of the size of the window, and if the size becomes smaller, display of video pictures other than the portrait part can be reduced.

Step 205, when it is determined, according to the gesture operation, that the first parallel window is moving towards the second parallel window, and an overlapped area of the first parallel window and the second parallel window reaches a first area threshold, switching display positions of the first parallel window and the second parallel window.

In the second layout mode, gesture operations such as dragging can be used to move one of the parallel windows towards another parallel window, so as to implement switching of display positions of the two windows. As shown in an interface d in FIG. 3, the first parallel window 303 is dragged towards the second parallel window 305, and a part of area of the window is allowed to be hidden in the moving process, for example, a display area of the first parallel window 303 in the interface d is smaller than a display area of the first parallel window 303 in the interface c. If the overlapping area of the first parallel window 303 and the second parallel window 305 reaches the first area threshold, the positions are switched. In an embodiment, the positions can also be switched when it is detected that the first parallel window is released. The display effect is shown in an interface e in FIG. 3.

Step 206, when it is determined, according to the gesture operation, that a first parallel window is dragged into a second preset area range at two sides of the video call interface, switching and displaying a second parallel window as the main window in the first layout mode, and simultaneously switching and displaying the first parallel window as a sub-window.

As shown in an interface f in FIG. 3, it is assumed that the left area and the right area of the three areas divided by dotted lines all correspond to the second preset area range, then the first parallel window 303 in the interface f has already been dragged into the second preset area range, and then the second parallel window 305 can be switched to be displayed as a new main window 306 in the first layout mode. At the same time, as shown in an interface g in FIG. 3, the first parallel window 303 is switched to be displayed as a new sub-window 307.

Step 207, when it is determined, according to the gesture operation, that the first sub-window is released, fixing a display position of the first sub-window.

According to the method for controlling display of video call interface provided by embodiments of the present disclosure, gesture operations such as dragging can be used to implement flexible and convenient switching between the large-small screen layout mode and the upper-lower screen layout mode, and in different layout modes, gesture operations can also be used to flexibly adjust the display size or display position of each window, so that the display mode of the video call interface is more diversified, and switching entrance such as buttons are omitted, so that the space of the video call interface can be saved, and the appearance of the video call interface is made more pretty.

Figure 4:
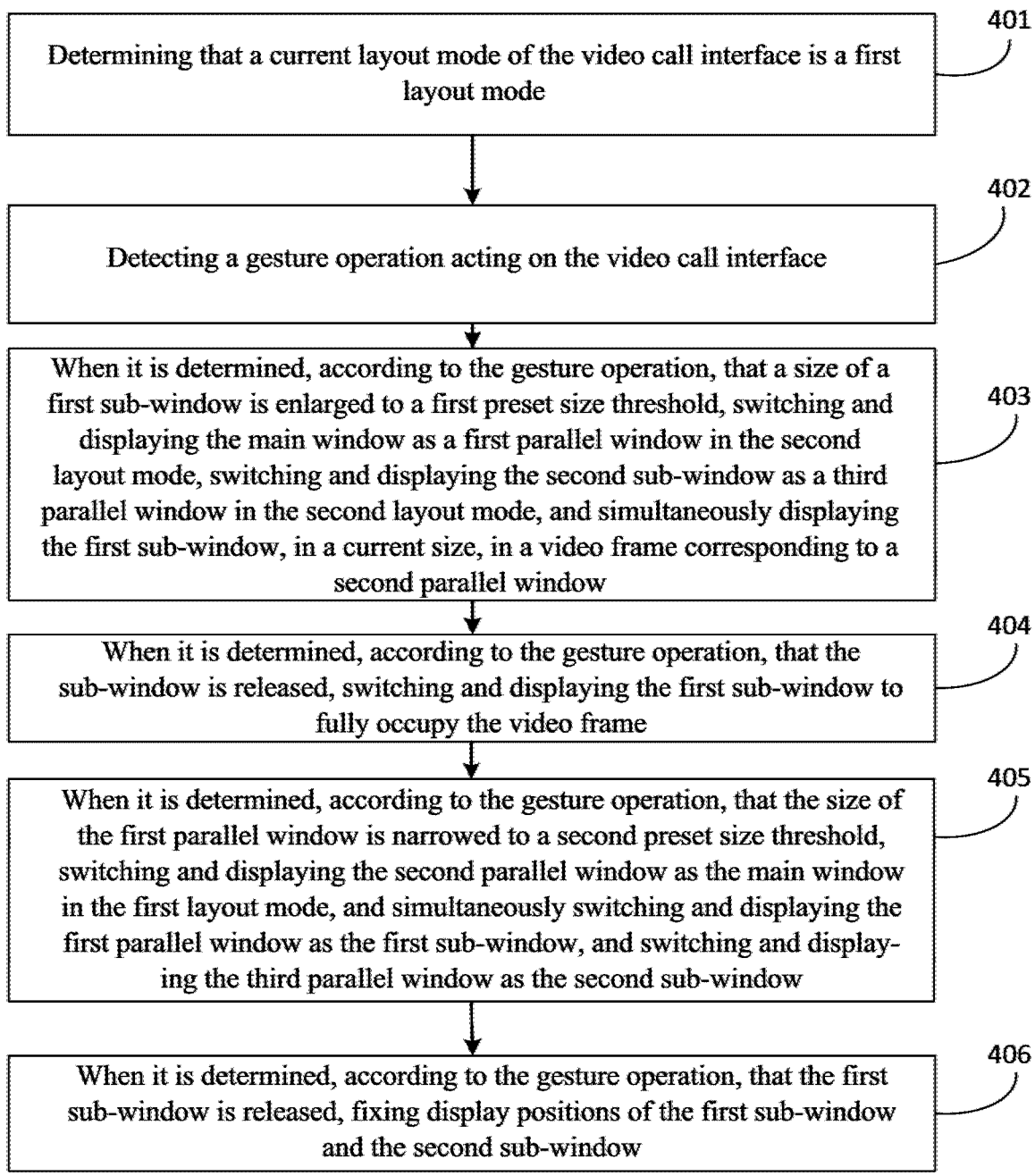
FIG. 4 is a schematic flowchart of another method for controlling display of a video call interface provided by an embodiment of the present disclosure.

FIG. 4 is a schematic flowchart of another method for controlling display of a video call interface provided by an embodiment of the present disclosure. Taking a multi-person call mode (for ease of description, a three-party call is assumed) as an example, as shown in FIG. 4, the method includes:

step 401, determining that a current layout mode of the video call interface is a first layout mode.

Figure 5:
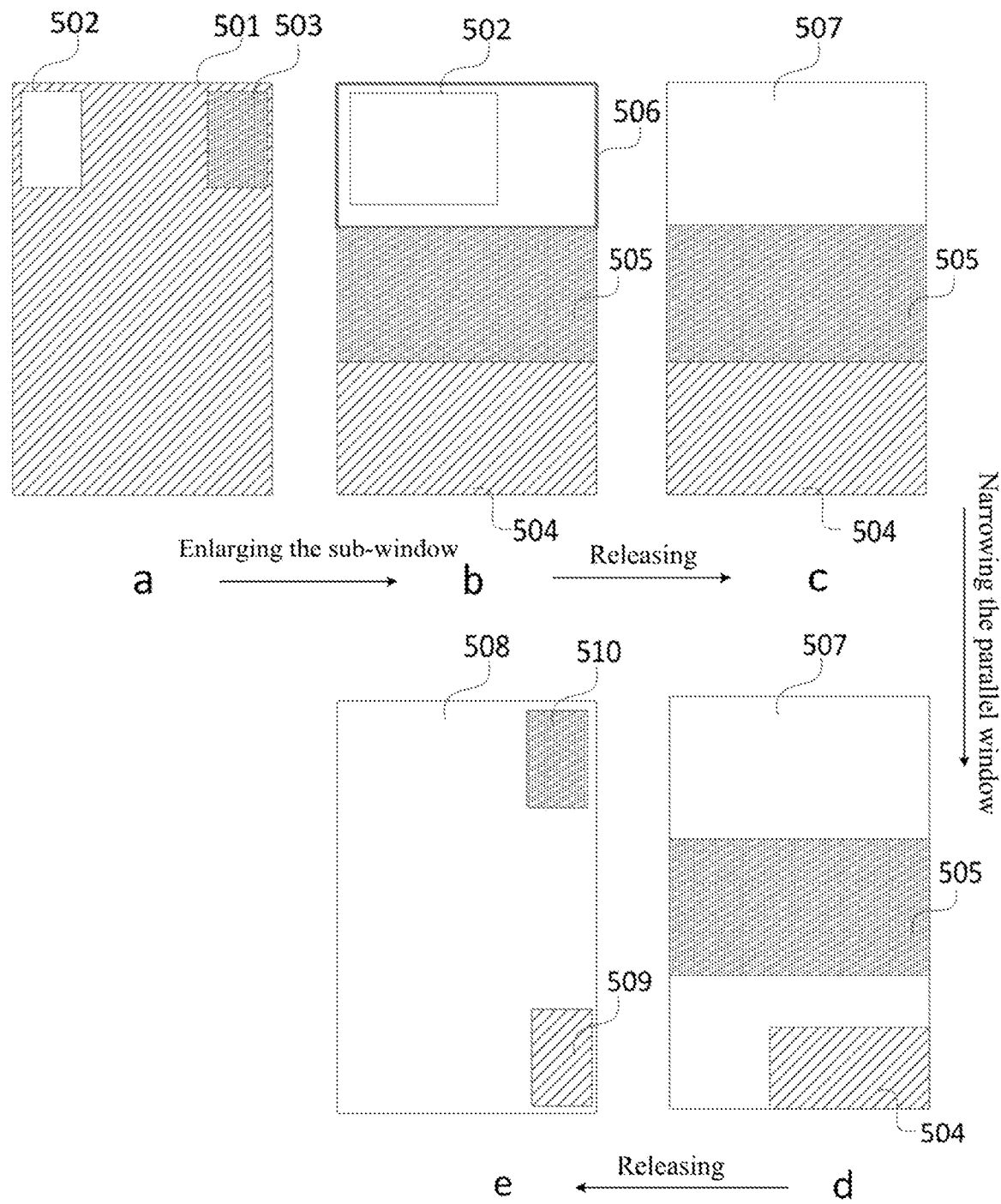
FIG. 5 is a schematic diagram of another switching procedure of layout modes provided by an embodiment of the present disclosure.

FIG. 5 is a schematic diagram of another switching procedure of layout modes provided by an embodiment of the present disclosure. The video call interface in a first layout mode is shown as an interface a in FIG. 5, which includes a main window 501, a first sub-window 502 and a second sub-window 503.

Illustratively, in this layout mode, the second sub-window 503 can be hidden beneath the first sub-window 502 through gesture operations (for example, long press on the first sub-window 502), and a stacking order of the second sub-window 503 and the first sub-window 502 can also be switched (for example, click on the first sub-window 502), that is, to hide the first sub-window 502 beneath the second sub-window 503, and it is also possible to restore display of both the two sub-windows, for example, long press on the sub-window currently displayed.

Step 402, detecting a gesture operation acting on the video call interface.

Step 403, when it is determined, according to the gesture operation, that a size of a first sub-window is enlarged to a first preset size threshold, switching and displaying the main window as a first parallel window in the second layout mode, switching and displaying the second sub-window as a third parallel window in the second layout mode, and simultaneously displaying the first sub-window, in a current size, in a video frame corresponding to a second parallel window.

As shown in an interface b in FIG. 5, when the size of the first sub-window 502 is enlarged to reach a first preset size threshold, the main window 501 is switched to be displayed as a first parallel window 504 in the second layout mode, the second sub-window is switched to be displayed as a third parallel window 505, and the first sub-window 502 is displayed, in a current size, in a video frame 506 corresponding to a second parallel window.

Step 404, when it is determined, according to the gesture operation, that the sub-window is released, switching and displaying the first sub-window to fully occupy the video frame.

Illustratively, when feeling that switching expectation is satisfied, the user can release the finger, so as to complete the switching from the first layout mode to the second layout mode. The effect after switching is shown in an interface c in FIG. 5, and after fully occupying the video frame, the first sub-window 502 becomes the second parallel window 507 in the second layout mode.

Step 405, when it is determined, according to the gesture operation, that a size of the first parallel window is narrowed to a second preset size threshold, switching and displaying the second parallel window as the main window in the first layout mode, and simultaneously switching and displaying the first parallel window as the first sub-window, and switching and displaying the third parallel window as the second sub-window.

As shown in an interface d in FIG. 5, the size of the first parallel window 504 is narrowed, and is about to reach the second preset size threshold. As shown in an interface e in FIG. 5, when the size of the first parallel window 504 reaches the second preset size threshold, the second parallel window is switched to be displayed as a main window 508 in the first layout mode, and the first parallel window 504 is switched to be displayed as a new first sub-window 509, and the third parallel window 505 is switched to be displayed as a new second sub-window 510. The position of the new second sub-window 510 can be preferentially restored to the original position, that is, the position in the interface a, and certainly, it can also be restored to other positions, which can be set according to actual requirements.

Step 406, when it is determined, according to the gesture operation, that the first sub-window is released, fixing display positions of the first sub-window and the second sub-window.

According to the method for controlling display of video call interface provided by embodiments of the present disclosure, gesture operations such as finger scaling can be used to implement flexible and convenient switching between the large-small screen layout mode and the upper-lower screen layout mode, and in different layout modes, gesture operations can also be used to flexibly adjust the display size or display position of each window, so that the display mode of the video call interface is more diversified, and switching entrance such as buttons are omitted, so that the space of the video call interface can be saved, and the appearance of the video call interface is made more pretty.

Figure 6:
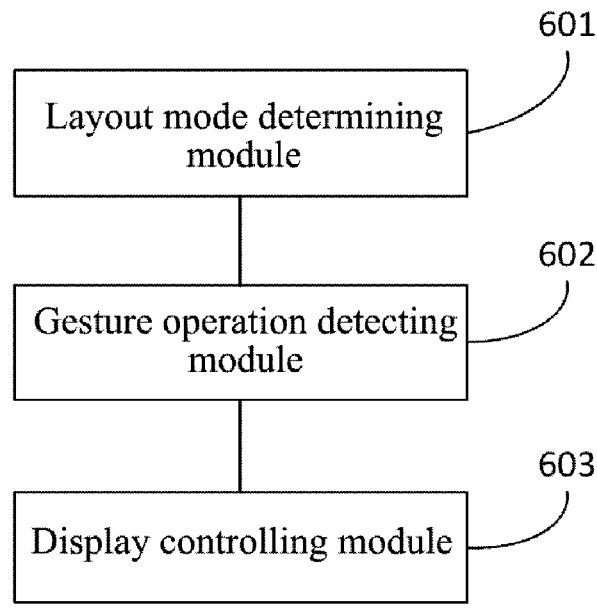
FIG. 6 is a structural block diagram of an apparatus for controlling display of a video call interface provided by an embodiment of the present disclosure.

FIG. 6 is a structural block diagram of an apparatus for controlling display of a video call interface provided by an embodiment of the present disclosure, and the apparatus can be implemented by software and/or hardware, and generally can be integrated in an electronic device, and can control display of the video call interface by performing the method for controlling display of the video call interface. As shown in FIG. 6, the apparatus includes:

a layout mode determining module 601, configured to determine a current layout mode of the video call interface;

a gesture operation detecting module 602, configured to detect a gesture operation acting on the video call interface;

a display controlling module 603, configured to: when it is determined that the gesture operation satisfies a preset switch condition corresponding to the current layout mode, control the video call interface to switch to another corresponding layout mode.

According to the apparatus for controlling display of the video call interface provided by the embodiment of the present disclosure, the gesture operation can be used to switch the layout mode of the video call interface effectively and conveniently, switching entrance such as buttons can be omitted, so as to save space of the video call interface, and the appearance of the video call interface is also made more pretty.

In an embodiment, the video call interface at least includes a first layout mode and a second layout mode; the first layout mode includes a main window and at least one sub-window, where the at least one sub-window is nested in the main window; the second layout mode includes at least two parallel windows, where each of the parallel windows displays a complete video picture of a calling party.

In an embodiment, the display controlling module 603 may be configured to: if the current layout mode is the first layout mode, and when it is determined, according to the gesture operation, that a first sub-window is dragged into a first preset area range at a center of the video call interface, switch and display the main window as a first parallel window in the second layout mode, and simultaneously display the first sub-window, in an original size, in a video frame corresponding to a second parallel window; and after it is determined, according to the gesture operation, that the first sub-window is released, switch and display the first sub-window to fully occupy the video frame.

In an embodiment, the display controlling module 603 is further configured to: if the current layout mode includes a second sub-window, while displaying the first sub-window in the video frame corresponding to the second parallel window, display the second sub-window, in an original size, in a video frame corresponding to a third parallel window, or switch and display the second sub-window as a third parallel window.

In an embodiment, the display controlling module 603 may be configured to: if the current layout mode is the second layout mode, and when it is determined, according to the gesture operation, that a first parallel window is dragged into a second preset area range at two sides of the video call interface, switch and display a second parallel window as the main window in the first layout mode, and simultaneously switch and display the first parallel window as a first sub-window; and after it is determined, according to the gesture operation, that the first sub-window is released, fix a display position of the first sub-window.

In an embodiment, the display controlling module 603 may be configured to: if the current layout mode is the first layout mode, and when it is determined, according to the gesture operation, that a size of a first sub-window is enlarged to a first preset size threshold, switch and display the main window as a first parallel window in the second layout mode, and simultaneously display the first sub-window, in a current size, in a video frame corresponding to a second parallel window; and after it is determined, according to the gesture operation, that the first sub-window is released, switch and display the first sub-window to fully occupy the video frame.

In an embodiment, the display controlling module 603 may be configured to: if the current layout mode is the second layout mode, and when it is determined, according to the gesture operation, that a size of a first parallel window is narrowed to a second preset size threshold, switch and display a second parallel window as the main window in the first layout mode, and simultaneously switch and display the first parallel window as a first sub-window; and after it is determined, according to the gesture operation, that the first sub-window is released, fix a display position of the first sub-window.

In an embodiment, the display controlling module 603 may be configured to: if the current layout mode is the second layout mode, then after the detecting the gesture operation acting on the video call interface, when it is determined, according to the gesture operation, that a first parallel window is moving towards a second parallel window, and an overlapped area of the first parallel window and the second parallel window reaches a first area threshold, switch display positions of the first parallel window and the second parallel window.

In an embodiment, the display controlling module 603 may be configured to: after the detecting the gesture operation acting on the video call interface, and when it is determined that the gesture operation is a scaling operation acting on a first window, adjust a display size of the first window according to the scaling operation.

In an embodiment, the display controlling module 603 may be configured to: if the current layout mode is the first layout mode, then after the detecting the gesture operation acting on the video call interface, when it is determined, according to the gesture operation, that a first sub-window is dragged into a third preset area range in the main window, switch display positions of the first sub-window and the main window.

In an embodiment, the display controlling module 603 may be configured to: if the current layout mode is the first layout mode and there exist at least two sub-windows, then after the detecting gesture operation acting on the video call interface, when a first preset gesture operation acting on a first sub-window is detected, hide other sub-windows beneath the first sub-window; when a second preset gesture operation acting on the first sub-window is detected, switch video pictures of the first sub-window and a second sub window hidden beneath the first sub-window; when a third preset gesture operation acting on the first sub-window is detected, switch all sub-windows hidden beneath the first sub-window to a top layer of the video call interface for display.

Figure 7:
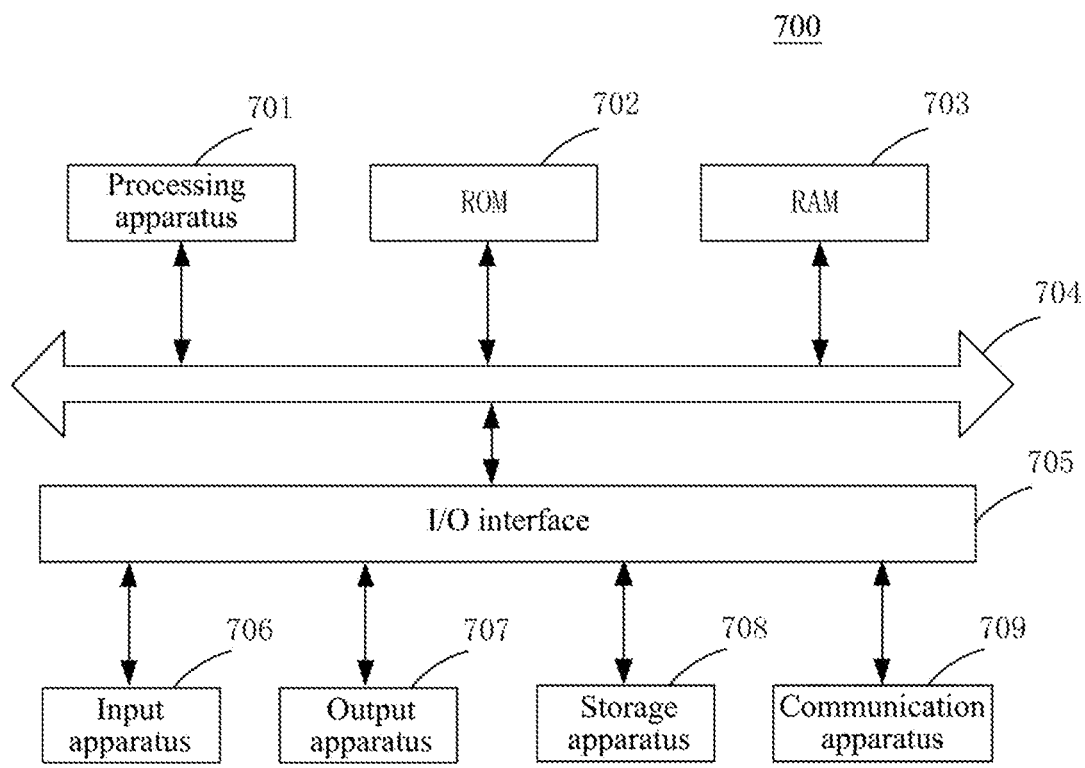
FIG. 7 is a structural block diagram of an electronic device provided by an embodiment of the present disclosure.

Referring to FIG. 7, FIG. 7 shows a schematic structural diagram of an electronic device 700 adapted to implement embodiments of the present disclosure. The electronic device in the embodiment of the present disclosure may include, but is not limited to, mobile terminals such as a mobile phone, a notebook computer, a digital broadcast receiver, a PDA (personal digital assistant), a PAD (tablet computer), a PMP (portable multimedia player), a vehicle-mounted terminal (for example, vehicle navigation terminal), and fixed terminals such as a digital TV, a desktop computer, etc. The electronic device shown in FIG. 7 is only an example, and should not bring any limitation to the functions and application scope of the embodiments of the present disclosure.

As shown in FIG. 7, the electronic device 700 may include a processing apparatus (such as a central processing unit, a graphics processor, etc.) 701, which may perform various appropriate actions and processes according to a program stored in a read-only memory (ROM) 702 or a program loaded into a random access memory (RAM) 703 from a storage apparatus 708. In the RAM 703, various programs and data required for operations of the electronic device 700 are also stored therein. The processing apparatus 701, the ROM 702 and the RAM 703 are mutually connected through a bus 704. An input/output (I/O) interface 705 is also connected to the bus 704.

Generally, the following apparatuses can be connected to the I/O interface 705: an input apparatus 706 including, for example, a touch screen, a touch pad, a keyboard, a mouse, a camera, a microphone, an accelerometer, a gyroscope, and the like; an output apparatus 707 including a liquid crystal display (LCD), a speaker, a vibrator, etc.; a storage apparatus

708 including a magnetic tape, a hard disk, etc.; and a communication apparatus 709. The communication apparatus 709 may allow the electronic device 700 to perform wireless or wired communication with other devices to exchange data. Although FIG. 7 shows the electronic device 700 with various apparatuses, it should be understood that it is not required to implement or have all the apparatuses shown. More or fewer apparatuses may be implemented or provided instead.

Particularly, according to the embodiments of the present disclosure, the process described above with reference to the flowchart can be implemented as a computer software program. For example, embodiments of the present disclosure include a computer program product, which includes a computer program carried on a non-transitory computer-readable medium, and the computer program contains a program code for executing the method shown in the flowchart. In such embodiment, the computer program can be downloaded and installed from a network through the communication device 709, or installed from the storage device 708 or the ROM 702. When the computer program is executed by the processing apparatus 701, the above functions defined in the method of the embodiment of the present disclosure are performed.

It should be noted that the above-mentioned computer-readable medium of the present disclosure can be a computer-readable signal medium or a computer-readable storage medium or any combination of the above two. The computer-readable storage medium can be, for example, but not limited to, an electronic, magnetic, optical, electromagnetic, infrared, or semiconductor system, apparatus or component, or a combination of any of the above. More specific examples of the computer-readable storage medium may include, but are not limited to: an electrical connection with one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage component, a magnetic storage component, or any suitable combination of the above. In the present disclosure, the computer-readable storage medium can be any tangible medium that contains or stores a program that can be used by or in connection with an instruction execution system, apparatus or component. In the present disclosure, a computer-readable signal medium may include data signals propagated in a baseband or as part of a carrier wave, in which computer-readable program codes are carried. This propagated data signal can take various forms, including but not limited to electromagnetic signal, optical signal or any suitable combination of the above. The computer-readable signal medium can also be any computer-readable medium other than the computer-readable storage medium, which can send, propagate or transport a program for use by or in connection with an instruction execution system, apparatus or component. The program code contained on the computer-readable medium can be transmitted by any suitable medium, including but not limited to: an electric wire, an optical cable, RF (radio frequency), etc., or any suitable combination of the above.

The computer-readable medium may be included in the above-mentioned electronic device; or can exist separately without being assembled into the electronic device.

The computer-readable medium carries one or more programs, and when the one or more programs are executed by the electronic device, the electronic device is caused to: determine a current layout mode of the video call interface; detect a gesture operation acting on the video call interface; and when it is determined that the gesture operation satisfies a preset switch condition corresponding to the current layout mode, control the video call interface to switch to another corresponding layout mode.

Computer program codes for performing the operations of the present disclosure can be written in one or more programming languages or their combinations, including but not limited to object-oriented programming languages such as Java, Smalltalk, C++, and conventional procedural programming languages such as "C" language or similar programming languages. The program codes can be executed completely on the user's computer, partially on the user's computer, as an independent software package, partially on the user's computer and partially on a remote computer, or completely on a remote computer or server. In the case of a remote computer, the remote computer can be connected to a user computer through any kind of networks, including a local area network (LAN) or a wide area network (WAN), or can be connected to an external computer (for example, using an Internet service provider to connect through the Internet).

The embodiment of the present disclosure further provides a computer program stored in a readable storage medium, where at least one processor of an electronic device can read the computer program from the readable storage medium, and the at least one processor executes the computer program to cause the electronic device to perform the method according to any one of the above embodiments.

The flowchart and block diagram in the drawings illustrate the architecture, functions and operations of possible implementations of systems, methods and computer program products according to various embodiments of the present disclosure. To this point, each block in the flowchart or block diagram may represent a module, a program segment, or part of a code, which contains one or more executable instructions for implementing the specified logical functions. It should also be noted that in some alternative implementations, the functions marked in the blocks may also occur in a different order than those marked in the drawings. For example, two consecutive blocks can actually be executed basically in parallel, and sometimes they can be executed in a reverse order, depending on the functions involved. It should also be noted that each block in the block diagram and/or flowchart, and the combination of blocks in the block diagram and/or flowchart, can be implemented by a dedicated hardware-based system that performs specified functions or operations, or can be implemented by a combination of dedicated hardware and computer instructions.

The modules involved in the embodiments described in the present disclosure can be implemented by software, or can be implemented by hardware. Names of the modules do not constitute the limitation of the modules per se in some cases. For example, the layout mode determining module can also be described as "a module for determining a current layout mode of the video call interface".

The functions described above herein can be at least partially performed by one or more hardware logic components. For example, without limitation, exemplary types of hardware logic components that can be used include: a field programmable gate array (FPGA), an application specific integrated circuit (ASIC), application specific standard parts (ASSP), a system on chip (SOC), a complex programmable logic device (CPLD), etc.

In the context of the present disclosure, a machine-readable medium can be a tangible medium that can contain or store a program to be used by an instruction execution system, apparatus or device, or to be used in combination with the instruction execution system, apparatus or device. The machine-readable medium may be a machine-readable signal medium or a machine-readable storage medium. The machine-readable medium can include, but is not limited to, an electronic, magnetic, optical, electromagnetic, infrared, or semiconductor system, apparatus or device, or any suitable combination of the above. More specific examples of the machine-readable storage medium will include an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

The above description is only preferred embodiments of the present disclosure and description of the applied technical principle. It should be understood by those skilled in the art that the disclosure scope involved in the present disclosure is not limited to the technical solutions formed by the specific combination of the above technical features, but also covers other technical solutions formed by any combination of the above technical features or their equivalent features without departing from the above concept of the disclosure. For example, the technical solutions formed by replacing the above features with (but not limited to) technical features with similar functions disclosed in the present disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above description, these should not be interpreted as limiting the scope of the present disclosure. Some features described in the context of separate embodiments can also be implemented, in combination, in a single embodiment. On the contrary, various features described in the context of a single embodiment can also be implemented in multiple embodiments alone or in any suitable subcombination.

Although the subject matter has been described with language specific to structural features and/or logical acts of methods, it should be understood that the subject matter defined in the appended claims is not necessarily limited to the specific features or acts described above. On the contrary, the specific features and actions described above are only illustrative forms to implement the claims.

What is claimed is:

1. A method for controlling display of a video call interface, comprising:
    determining a current layout mode of the video call interface;
    detecting a gesture operation acting on the video call interface; and
    when it is determined that the gesture operation satisfies a preset switch condition corresponding to the current layout mode, controlling the video call interface to switch to another corresponding layout mode;
    wherein at least a first layout mode and a second layout mode exist in the video call interface;
    wherein the first layout mode comprises a main window for video call and at least one sub-window for video call, and the at least one sub-window is nested in the main window and the at least one sub-window covers at least a part of a video picture of the main window; and
    wherein the second layout mode comprises at least two parallel windows for video call, each of the parallel windows displays a complete video picture of a calling party, and all windows for video call are parallel windows;
    in a case that the current layout mode is the first layout mode, when it is determined that the gesture operation satisfies the preset switch condition corresponding to the current layout mode, controlling the video call interface to switch to another corresponding layout mode comprises:
        when it is determined, according to the gesture operation, that a first sub-window for video call is dragged into a first preset area range at a center of the video call interface, switching and displaying the main window for video call as a first parallel window in the second layout mode, and simultaneously displaying the first sub-window for video call, in an original size, in a video frame corresponding to a second parallel window;
        when it is determined, according to the gesture operation, that the first sub-window for video call is released, switching and displaying the first sub-window for video call to fully occupy the video frame;
    or,
    in a case that the current layout mode is the first layout mode, when it is determined that the gesture operation satisfies the preset switch condition corresponding to the current layout mode, controlling the video call interface to switch to another corresponding layout mode comprises:
        when it is determined, according to the gesture operation, that a size of a first sub-window is enlarged to a first preset size threshold, switching and displaying the main window as a first parallel window in the second layout mode, and simultaneously displaying the first sub-window, in a current size, in a video frame corresponding to a second parallel window;
        when it is determined, according to the gesture operation, that the first sub-window is released, switching and displaying the first sub-window to fully occupy the video frame.

2. The method according to claim 1, wherein if the current layout mode comprises a second sub-window, while displaying the first sub-window, in an original size, in the video frame corresponding to the second parallel window, the method further comprises:
    displaying the second sub-window, in an original size, in a video frame corresponding to a third parallel window, or switching and displaying the second sub-window as a third parallel window.

3. The method according to claim 1, wherein if the current layout mode is the second layout mode, wherein when it is determined that the gesture operation satisfies the preset switch condition corresponding to the current layout mode, controlling the video call interface to switch to another corresponding layout mode comprises:
    when it is determined, according to the gesture operation, that a first parallel window is dragged into a second preset area range at two sides of the video call interface, switching and displaying a second parallel window as the main window in the first layout mode, and simultaneously switching and displaying the first parallel window as a first sub-window;

when it is determined, according to the gesture operation, that the first sub-window is released, fixing a display position of the first sub-window.

4. The method according to claim 1, wherein if the current layout mode is the second layout mode, wherein when it is determined that the gesture operation satisfies the preset switch condition corresponding to the current layout mode, controlling the video call interface to switch to another corresponding layout mode comprises:

when it is determined, according to the gesture operation, that a size of a first parallel window is narrowed to a second preset size threshold, switching and displaying a second parallel window as the main window in the first layout mode, and simultaneously switching and displaying the first parallel window as a first sub-window;

when it is determined, according to the gesture operation, that the first sub-window is released, fixing a display position of the first sub-window.

5. The method according to claim 1, wherein if the current layout mode is the second layout mode, after the detecting the gesture operation acting on the video call interface, the method further comprises:

when it is determined, according to the gesture operation, that a first parallel window is moving towards a second parallel window, and an overlapped area of the first parallel window and the second parallel window reaches a first area threshold, switching display positions of the first parallel window and the second parallel window.

6. The method according to claim 1, after the detecting the gesture operation acting on the video call interface, the method further comprises:

when it is determined that the gesture operation is a scaling operation acting on a first window, adjusting a display size of the first window according to the scaling operation.

7. The method according to claim 1, wherein if the current layout mode is the first layout mode, after the detecting the gesture operation acting on the video call interface, the method further comprises:

when it is determined, according to the gesture operation, that a first sub-window is dragged into a third preset area range in the main window, switching display positions of the first sub-window and the main window.

8. The method according to claim 1, wherein if the current layout mode is the first layout mode and there exist at least two sub-windows, after the detecting the gesture operation acting on the video call interface, the method further comprises:

when a first preset gesture operation acting on a first sub-window is detected, hiding other sub-windows beneath the first sub-window;

when a second preset gesture operation acting on the first sub-window is detected, switching video pictures of the first sub-window and a second sub-window hidden beneath the first sub-window;

when a third preset gesture operation acting on the first sub-window is detected, switching all sub-windows hidden beneath the first sub-window to a top layer of the video call interface for displaying.

9. An apparatus for controlling display of a video call interface, comprising a memory, a processor and a computer program stored in the memory and executable on the processor, wherein when the processor executes the computer program, the processor is caused to:

determine a current layout mode of the video call interface;

detect a gesture operation acting on the video call interface;

when it is determined that the gesture operation satisfies a preset switch condition corresponding to the current layout mode, control the video call interface to switch to another corresponding layout mode;

wherein at least a first layout mode and a second layout mode exist in the video call interface;

wherein the first layout mode comprises a main window for video call and at least one sub-window for video call, and the at least one sub-window is nested in the main window and the at least one sub-window covers at least a part of a video picture of the main window;

wherein the second layout mode comprises at least two parallel windows for video call, each of the parallel windows displays a complete video picture of a calling party, and all windows for video call are parallel windows;

in a case that the current layout mode is the first layout mode, the processor is configured to:

when it is determined, according to the gesture operation, that a first sub-window for video call is dragged into a first preset area range at a center of the video call interface, switch and display the main window for video call as a first parallel window in the second layout mode, and simultaneously display the first sub-window for video call, in an original size, in a video frame corresponding to a second parallel window;

when it is determined, according to the gesture operation, that the first sub-window for video call is released, switch and display the first sub-window for video call to fully occupy the video frame;

or, in a case that the current layout mode is the first layout mode, the processor is configured to:

when it is determined, according to the gesture operation, that a size of a first sub-window is enlarged to a first preset size threshold, switch and display the main window as a first parallel window in the second layout mode, and simultaneously display the first sub-window, in a current size, in a video frame corresponding to a second parallel window;

when it is determined, according to the gesture operation, that the first sub-window is released, switch and display the first sub-window to fully occupy the video frame.

10. The apparatus according to claim 9, wherein if the current layout mode comprises a second sub-window, the processor is configured to:

display the second sub-window, in an original size, in a video frame corresponding to a third parallel window, or switch and display the second sub-window as a third parallel window.

11. The apparatus according to claim 9, wherein if the current layout mode is the second layout mode, the processor is configured to:

when it is determined, according to the gesture operation, that a first parallel window is dragged into a second preset area range at two sides of the video call interface, switch and display a second parallel window as the main window in the first layout mode, and simultaneously switch and display the first parallel window as a first sub-window;

when it is determined, according to the gesture operation, that the first sub-window is released, fix a display position of the first sub-window.

12. The apparatus according to claim 9, wherein if the current layout mode is the second layout mode, the processor is configured to:

when it is determined, according to the gesture operation, that a size of a first parallel window is narrowed to a second preset size threshold, switch and display a second parallel window as the main window in the first layout mode, and simultaneously switch and displaying the first parallel window as a first sub-window;

when it is determined, according to the gesture operation, that the first sub-window is released, fix a display position of the first sub-window.

13. The apparatus according to claim 9, wherein if the current layout mode is the second layout mode, the processor is configured to:

when it is determined, according to the gesture operation, that a first parallel window is moving towards a second parallel window, and an overlapped area of the first parallel window and the second parallel window reaches a first area threshold, switch display positions of the first parallel window and the second parallel window.

14. A non-transitory computer-readable storage medium, storing a computer program, wherein when the program is executed by a processor, the processor is caused to:

determine a current layout mode of a video call interface;

detect a gesture operation acting on the video call interface;

when it is determined that the gesture operation satisfies a preset switch condition corresponding to the current layout mode, control the video call interface to switch to another corresponding layout mode;

wherein at least a first layout mode and a second layout mode exist in the video call interface;

wherein the first layout mode comprises a main window for video call and at least one sub-window for video call, and the at least one sub-window is nested in the main window and the at least one sub-window covers at least a part of a video picture of the main window; and wherein the second layout mode comprises at least two parallel windows for video call, each of the parallel windows displays a complete video picture of a calling party, and all windows for video call are parallel windows;

in a case that the current layout mode is the first layout mode, the processor is caused to:

when it is determined, according to the gesture operation, that a first sub-window for video call is dragged into a first preset area range at a center of the video call interface, switch and display the main window for video call as a first parallel window in the second layout mode, and simultaneously displaying the first sub-window for video call, in an original size, in a video frame corresponding to a second parallel window;

when it is determined, according to the gesture operation, that the first sub-window for video call is released, switch and display the first sub-window for video call to fully occupy the video frame;

or, in a case that the current layout mode is the first layout mode, the processor is configured to:

when it is determined, according to the gesture operation, that a size of a first sub-window is enlarged to a first preset size threshold, switch and display the main window as a first parallel window in the second layout mode, and simultaneously display the first sub-window, in a current size, in a video frame corresponding to a second parallel window;

when it is determined, according to the gesture operation, that the first sub-window is released, switch and display the first sub-window to fully occupy the video frame.

* * * * *